United States Patent
Driggers et al.

(10) Patent No.: US 6,485,150 B1
(45) Date of Patent: Nov. 26, 2002

(54) TUNABLE SPECTRAL SOURCE

(75) Inventors: Ronald G. Driggers, Davidsonville, MD (US); Ellis E. Burroughs, Jr., Madison, AL (US); Donald N. Williams, San Diego; Charles S. Bendall, El Cajon, both of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/898,778

(22) Filed: Jul. 3, 2001

(51) Int. Cl.⁷ .................................................. G02B 5/04
(52) U.S. Cl. ...................... 359/615; 359/361; 359/566; 359/831
(58) Field of Search ................................ 359/615, 361, 359/566, 831, 850, 857, 856, 861

(56) References Cited

U.S. PATENT DOCUMENTS

| | | |
|---|---|---|
| 4,895,790 A | 1/1990 | Swanson et al. |
| 5,148,157 A | 9/1992 | Florence |
| 5,379,065 A | 1/1995 | Cutts |
| 5,457,493 A | 10/1995 | Leddy et al. |
| 5,508,525 A | 4/1996 | Day et al. |
| 5,602,389 A | 2/1997 | Kato et al. |
| 5,793,042 A | 8/1998 | Quick |
| 5,808,797 A | 9/1998 | Bloom et al. |
| 5,841,579 A | 11/1998 | Bloom et al. |
| 5,889,567 A | 3/1999 | Swanson et al. |
| 5,949,081 A | 9/1999 | Ashley et al. |
| 5,953,152 A | 9/1999 | Hewlett |
| 6,067,840 A | 5/2000 | Chelvayohan et al. |
| 6,081,332 A | 6/2000 | Kojima |
| 6,124,593 A | 9/2000 | Bly et al. |

Primary Examiner—Mohammad Sikder
(74) Attorney, Agent, or Firm—Michael A. Kagan; Peter A. Lipovsky; James A. Ward

(57) ABSTRACT

A tunable spectral source includes an enclosure having first and second apertures; an optical dispersive element positioned in the enclosure; and multiple pixel source elements that are individually controllable for selectively directing one or more broadband light signals through the first aperture to irradiate the optical dispersive element. Each of the broadband light signals irradiates the optical dispersive element at a unique angle of incidence. The optical dispersive element disperses the broadband light signals into spectral component signals at dispersion angles that are dependent upon the angle of incidence of each broadband light signal that irradiates the optical dispersive element. The portions of the spectral component signals that are emitted through the second aperture are determined by selecting one or more particular pixel source elements to irradiate the optical dispersive element.

7 Claims, 6 Drawing Sheets

TUNABLE SPECTRAL SOURCE

BACKGROUND OF THE INVENTION

The present invention relates to spectral energy sources, and more particularly, to a tunable spectral energy source that uses the dispersive effect of electromagnetic energy to select spectral components that are emitted from the spectral source.

One type of device for isolating single spectral bands of broad band illumination sources is a monochromator. These devices isolate and emit a narrow region of a spectrum. Spectral tuning is accomplished by rotating the diffraction grating to the angle corresponding to the desired emission wavelength. Spectra can be constructed by sequentially tuning the diffraction grating through the necessary wavelength range. The intensity at each wavelength is controlled by the length of time the grating remains at the corresponding angle. Practically, the sequential nature of this procedure limits the usefulness of monochromators for simulating spectral sources because the time required to construct the spectrum may often exceed the sensor integration times.

Another type of system for isolating a particular wavelength of light in the infrared, visible, or ultraviolet regions is based upon a technique known as "aperture filling." Basic physics principals of aperture filling state that binary amplitude gratings can be used to expand the light from an aperture to uniformly fill an aperture with a width less than or equal to 4 times the width of the small aperture. Conversely, light from a large aperture can be concentrated into a sub-aperture with a width greater than or equal to 0.25 times the width of the large aperture. This technique to concentrate red, green and blue light from a large aperture into three sub-apertures. The intensity of the light in each sub-aperture is controlled with digital micro mirror or liquid crystal devices. Aperture filling limits the number of sub-apertures to four, which in turn limits the technique to applications requiring four or less spectral bands. Because this technique is constrained to a corresponding fill factor or 0.25 or greater, only four controllable wavelength bands may be emitted at a single time.

At present there is no device that can be operated quickly and electronically to simulate random complex spectra covering a wide wavelength band. Therefore, a need exists for a tunable spectral source that can emit spectra over a wide bandwidth, particularly, optical spectra ranging from long infrared to ultraviolet light.

SUMMARY OF THE INVENTION

The present invention provides a tunable spectral source for emitting optical energy characterized by a particular bandwidth, or spectral range. The invention takes advantage of the fact that broadband light such as white light may be refracted, or broken down into it multi-spectral, or multi-colored spectral components. The tunable spectral source includes an enclosure having first and second apertures; an optical dispersive element positioned in the enclosure; and multiple pixel source elements that are individually controllable for selectively directing one or more broadband light signals through the first aperture to irradiate the optical dispersive element. Each of the broadband light signals irradiates the optical dispersive element at a unique angle of incidence. The optical dispersive element disperses the broadband light signals into spectral component signals at dispersion angles that are dependent upon the angle of incidence of each broadband light signal that irradiates the optical dispersive element. The portions of the spectral component signals that are emitted through the second aperture are determined by selecting one or more particular broadband pixel source elements to irradiate the optical dispersive element.

DESCRIPTION OF THE PREFERRED EMBODIMENT

Figure 1:
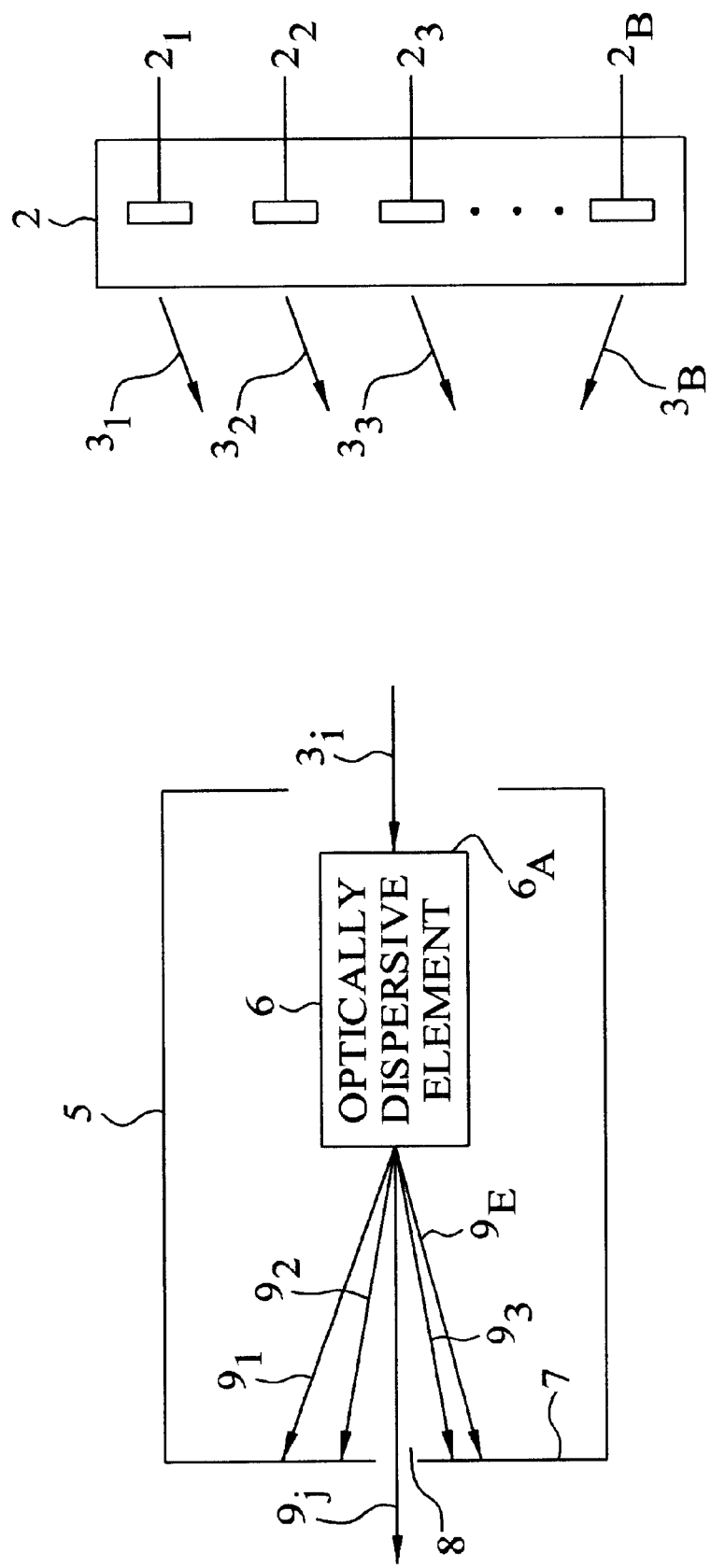
FIG. 1 is a block diagram of a tunable spectral source that embodies various features of the present invention.

Referring to FIG. 1, there is shown a tunable spectral source 1 that includes a broadband light source 2 having pixel source elements $2_1$, $2_2$, $2_3$, ... $2_B$ that may be selectively and individually controlled to each provide broadband light signals $3_1$, $3_2$, $3_3$, ... $3_B$, respectively, where B represents a positive integer. The term "tunable" refers to the fact that the spectral output signals, characterized by particular wavelengths and associated intensities, that are emitted from spectral source 1 are selectable within some bandwidth and gray scale range. Broadband light signals $3_1$, $3_2$, $3_3$, ... $3_B$, collectively referenced as light signal 3, are electromagnetic signals comprised of electromagnetic signal components characterized by wavelengths covering a spectral region of interest. For example, white light is one type of broadband light signal which is comprised of red, orange, yellow, green, blue, and purple optical spectral components. One or more of broadband light signals $3_1$, $3_2$, $3_3$, ... $3_B$ may be directed through aperture 4 of enclosure 5 whereupon they are incident upon surface 6A of optical dispersive element 6.

By way of example, dispersive element 6 may be implemented as an optical refractive element such as a prism, or as an optical diffractive element such as a diffraction grating. Optical dispersive element 6 separates those broadband lights signals $3_1$, $3_2$, $3_3$, ... $3_B$ that are incident upon it into the various spectral components characterized by a continuum of wavelengths that comprise each broadband light signal 3. For example, a prism is one type of optical dispersive element that separates white light into red, orange, yellow, green, blue, and purple optical spectral components by a process known as "refraction." Another type of optical dispersive element is a diffraction grating that separates white light into its spectral components by a process known as "diffraction." An important characteristic of spectral source 1 is that each of light signals $3_1$, $3_2$, $3_3$, ... $3_B$ irradiates optical dispersive element 6 at a unique angle of incidence. Broadband light source 2 may be embodied in different ways. For example, broadband light source 2 be embodied as thermal resistor arrays for generating light signals 3. Broadband light source 2 may be embodied as a variable intensity shutter such as liquid crystal arrays for modulating the intensity of a light signal generated by a broadband light source, not shown. Broadband light source 2 may alternatively be embodied as digital micro mirror arrays for reflecting a broadband light signal generated by a broadband light source, not shown. Each of the above-referenced examples of broadband light source 2 may be employed to rapidly intensity modulate the light signals $3_1$, $3_2$, $3_3$, ... $3_B$ The salient characteristic of broadband light source 2 is that each pixel source element $2_1$ through $2_B$ is individually controllable so as to cause one or more of broadband light signals $3_1$ through $3_B$ to be directed to irradiate surface 6A of optical dispersive element 6 at a unique angle.

Optical dispersive element 6 disperses any of broadband light signals $3_1, 3_2, 3_3, \ldots 3_B$ that are incident upon surface 6A into a continuum of spectral component signals which are shown for purposes of illustration as spectral component signals $9_1, 9_2, \ldots 9_E$. As shown by example in FIG. 1, only spectral component $9_j$, resulting from the selective enablement only of pixel $2_i$ causing emission of broadband light signal $3_i$, is dispersed so as to be emitted from aperture 8 of enclosure 5, where i is an index from 1 to B, and j is an index from 1 to E. The particular spectral component signals $9_1$, $9_2, \ldots 9_E$ that are emitted through aperture 8 are determined by which of pixel source elements $2_1, 2_2, 2_3, \ldots 2_B$ are directed to cause a broadband light signal $3_1, 3_2, 3_3, \ldots 3_B$ respectively, to irradiate optical dispersive element 6.

Figure 2:
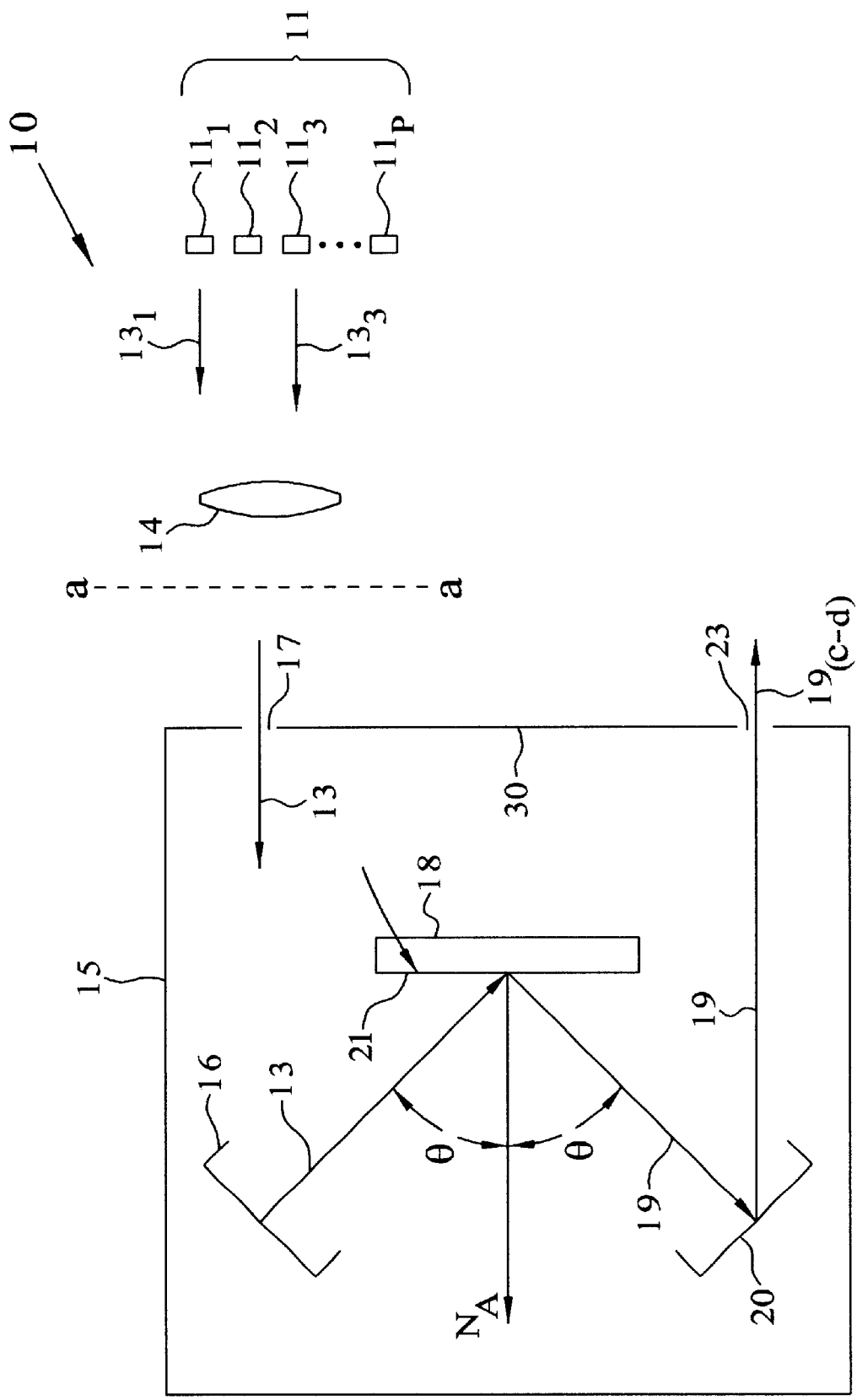
FIG. 2 is a more detailed view of a tunable spectral source that embodies various features of the present invention.
Figure 3A:
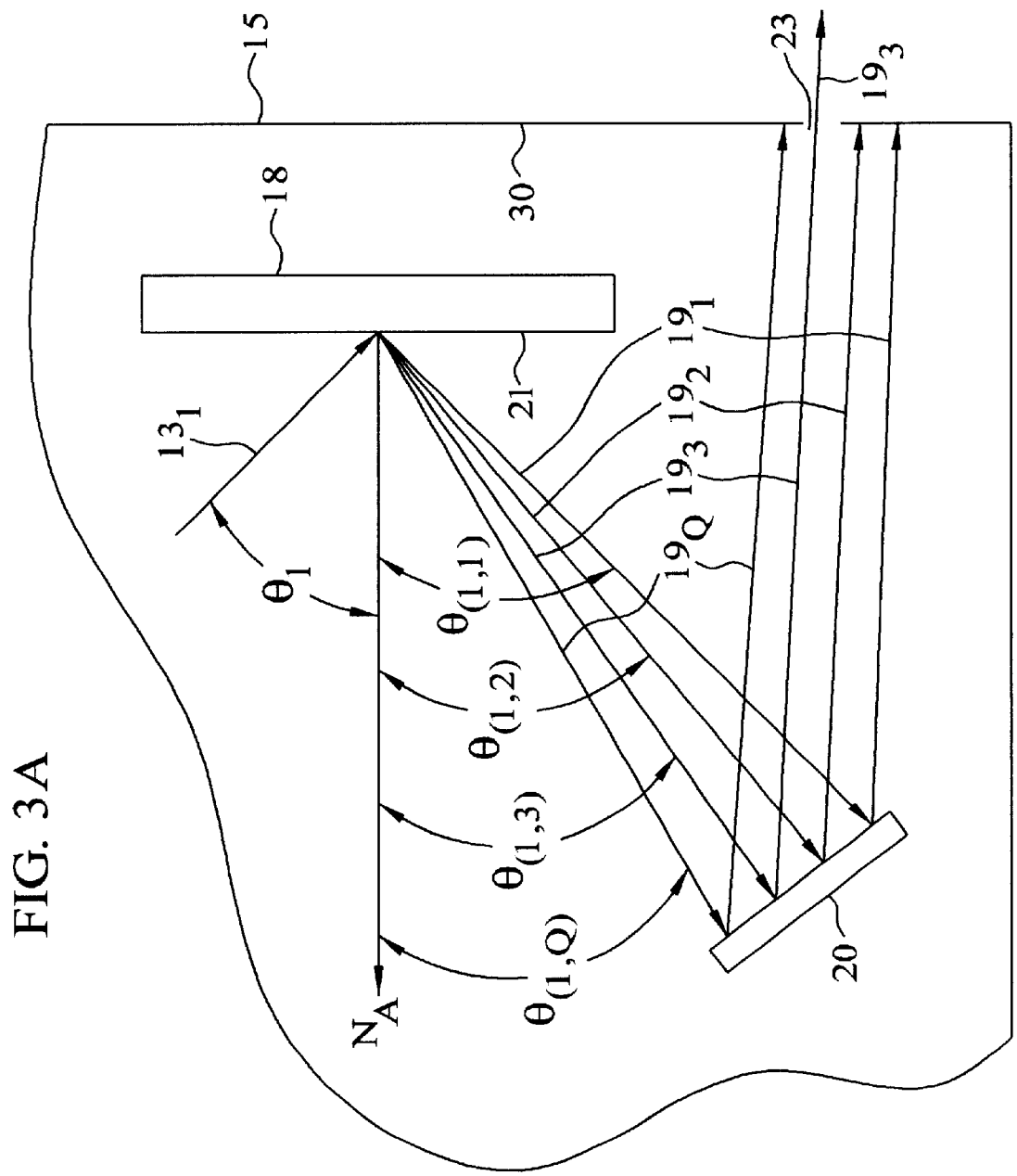
FIGS. 3A and 3B shows more detailed views of the spatial dispersion of the spectral component signals the enclosure of the tunable spectral source shown in FIG. 1.
Figure 3B:
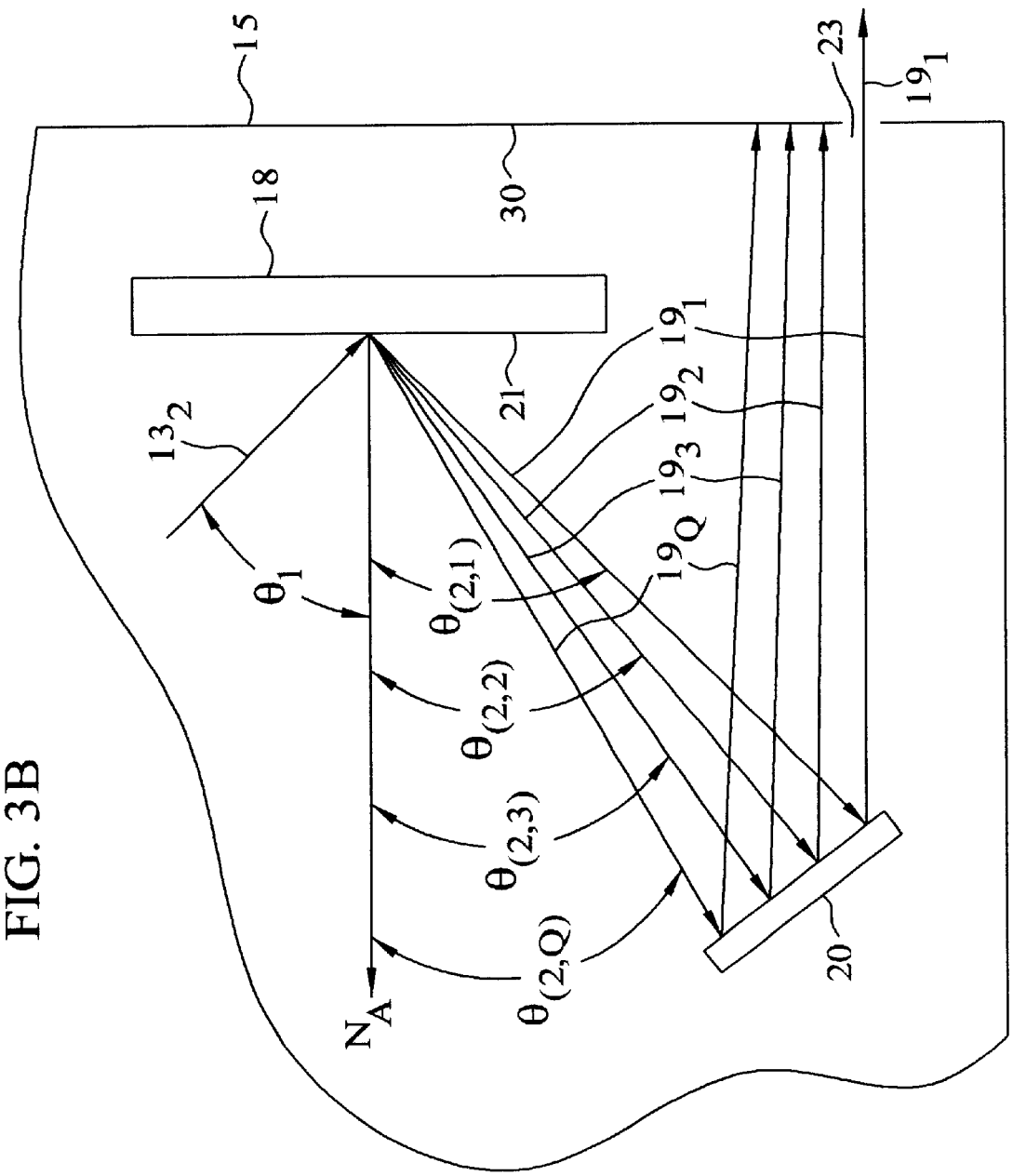

Referring to FIG. 2, there is shown a tunable spectral source 10 that includes a broadband light source 11 that includes spatially separated pixel source elements $11_1$, $11_2$, $11_3$, $11_4$, ... $11_P$, where P represents a positive integer. Broadband light source 11 may be embodied in different ways. For example, broadband light source 11 may be embodied as thermal resistor arrays for generating light signals 13. Broadband light source 11 may be embodied as a variable intensity shutter such as liquid crystal arrays for modulating the intensity of a light signal generated by a broadband light source, not shown. Broadband light source 11 may alternatively be embodied as digital micro mirror arrays for reflecting a broadband light signal generated by a broadband light source, not shown. Broadband pixel source elements $11_1$, $11_2$, $11_3$, $11_4$, ... $11_P$ individually and selectively maybe controlled so that one or more of broadband light signal $13_1, 13_2, 13_3, 13_4, \ldots 13_P$, respectively, are directed through lens 14 on to focal plane a-a, and then through aperture 17 into enclosure 15. Broadband light signals $13_1, 13_2, 13_3, 13_4, \ldots 13_P$ maybe collectively and individually referenced as broadband light signal 13. Focused light signal 13 is reflected and collimated by mirror 16, whereupon one or more of light signals light signals $13_1$, $13_2, 13_3, 13_4, \ldots 13_P$ irradiate optically diffractive element 18 at a unique angle of incidence $\theta_1, \theta_2, \theta_3, \theta_4, \ldots \theta_P$, respectively, with respect to a normal $N_A$ of surface 21 of optical diffractive element 18. By way of example, optical diffractive element 18 may be a diffraction grating, as shown in FIG. 2. Broadband light signal 13 is diffracted by optical diffractive element 18 into spectral component signal 19 comprised of a continuum of spectral component signals shown for purposes of illustration as component signals $19_1$, $19_2, 19_3, \ldots 19_Q$, where Q is a positive integer, as shown in FIGS. 3A and 3B. Selected ones $19_{(c-d)}$ of component signals $19_1, 19_2, 19_3, \ldots 19_Q$ are shown being emitted through aperture 23 of enclosure 15, as explained in detail below.

In FIG. 3A light signal $13_1$ is shown to irradiate optical diffractive element 18 at an angle of incidence $\theta_1$. Then the optical diffractive element 18 diffracts broadband light signal $13_1$ into spectral component light signals $19_1, 19_2, \ldots$ $19_Q$. The diffractive element 18 and the broadband light source 13 may be selected to operate in bands ranging anywhere from the ultraviolet to the long infrared. Spectral component signals $19_1, 19_2, \ldots 19_Q$, are diffracted from optical refractive element 18 at different angles $\Phi_{(1,1)}$, $\Phi_{(1,2)}, \ldots \Phi_{(1,Q)}$, respectively with respect to normal $N_A$ of surface 21. Next, spectral component signals $19_1, 19_2, \ldots$ $19_Q$, are reflected and focused by mirror 20. As shown in FIG. 3A, only spectral component $19_3$ is diffracted from optical diffractive element 18 at an angle $\Phi_3$ which allows it to be emitted from aperture 23. However, as shown in FIG. 3B, broadband light signal $13_2$ is directed to irradiate optical diffractive element 18 at an angle of incidence $\theta_2$, thereby resulting in emission of spectral components signals $19_1$, $19_2, \ldots 19_Q$ from surface 21. Since the angle of incidence $\theta_2$ is different from $\theta_1$, the angles of diffraction for spectral components $19_1, 19_2, \ldots 19_Q$ are $\Phi_{(2,1)}, \Phi_{(2,2)}, \ldots \Phi_{(2,Q)}$, respectively, where $\{\Phi_{(1,1)}, \Phi_{(1,2)}, \ldots \Phi_{(1,Q)}\} \neq \{\Phi_{(2,1)}, \Phi_{(2,2)}, \ldots \Phi_{(2,Q)},\}$ so that spectral component $19_1$ is at the correct diffractive angle $\Phi_{(1,1)}$ to exit aperture 23.

The tunable spectral source takes advantage of the dispersive spread over a particular distance of the spectral component signals that result when a broadband light signal 13 is diffracted. By way of example, broadband light signal 13 maybe white light. Thus, by careful selection of which pixel source elements irradiate surface 21 of optical diffractive element 18, selected portions of spectral component signal 19 may be emitted from tunable spectral source 10.

The number of individual pixel source elements $11_1$, $11_2$, $11_3, \ldots 11_P$ employed to irradiate optical diffraction element 18 controls the number of spectral regions of spectral output signals 19 that maybe directed through aperture 23. Except for apertures 17 and 23, enclosure 15 is generally opaque and preferably has a black interior to minimize the affect of ambient light, unwanted diffracted orders, and scattered light on the portion light signal 19 emitted from aperture 23.

Figure 4:
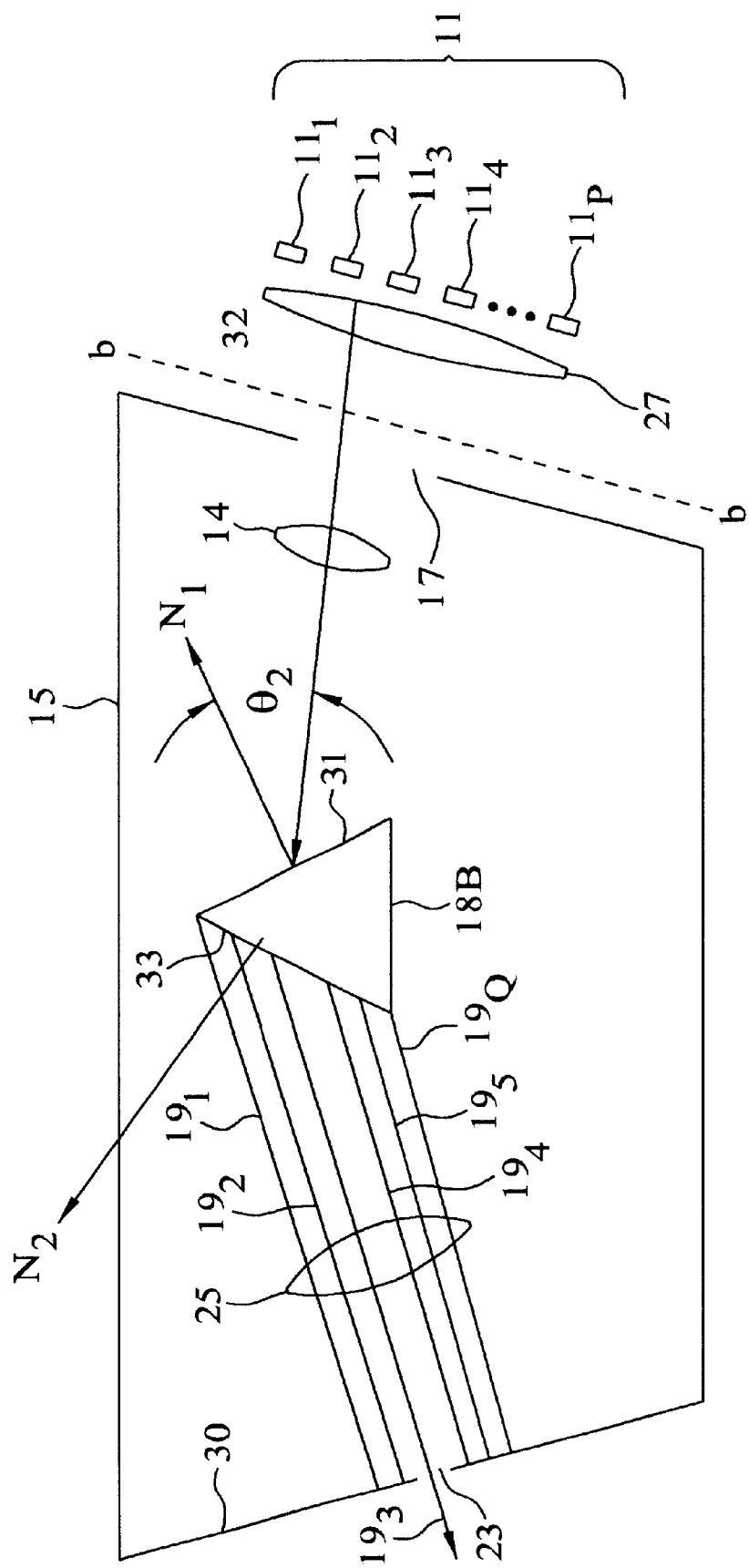
FIG. 4 shows another embodiment of a tunable spectral source that embodies various features of the present invention.

Referring to FIG. 4 there is shown another embodiment of tunable spectral source 10 that includes a broadband light source 11 that includes spatially separated pixel source elements $11_1, 11_2, 11_3, \ldots 11_P$ that individually or in combination may be enabled to each emit a broadband light signal $13_1, 13_2, 13_3, \ldots 13_P$, respectively. One or more of broadband light signal $13_1, 13_2, 13_3, \ldots 13_P$ are focused by lens 27 onto focal plane b—b and then directed through aperture 17 into enclosure 15. Those of broadband light signal $13_1, 13_2, 13_3, \ldots 13_P$ that are directed into enclosure 15 then are collimated by lens 14. Next, one or more of broadband light signals $13_1, 13_2, 13_3, \ldots 13_P$ irradiate optical refractive element 18B at an angle of incidence $\theta_i$ with respect to a ray $N_I$ that is normal to the surface 31 of optical refractive element 18B , where optical refractive element 18B is implemented as a prism. By way of example, only pixel source element $11_2$ is emitting broadband light signal $13_2$. Optical refractive element 18B refracts broadband light signal $13_2$ into spectral component light signals $19_1, 19_2, 19_3, \ldots 19_Q$ that are focused by lens 25 onto projection surface 30 of enclosure 15. In FIG. 4, component light signal $19_3$ is shown, by way of example, emitted through aperture 23.

Figure 5:
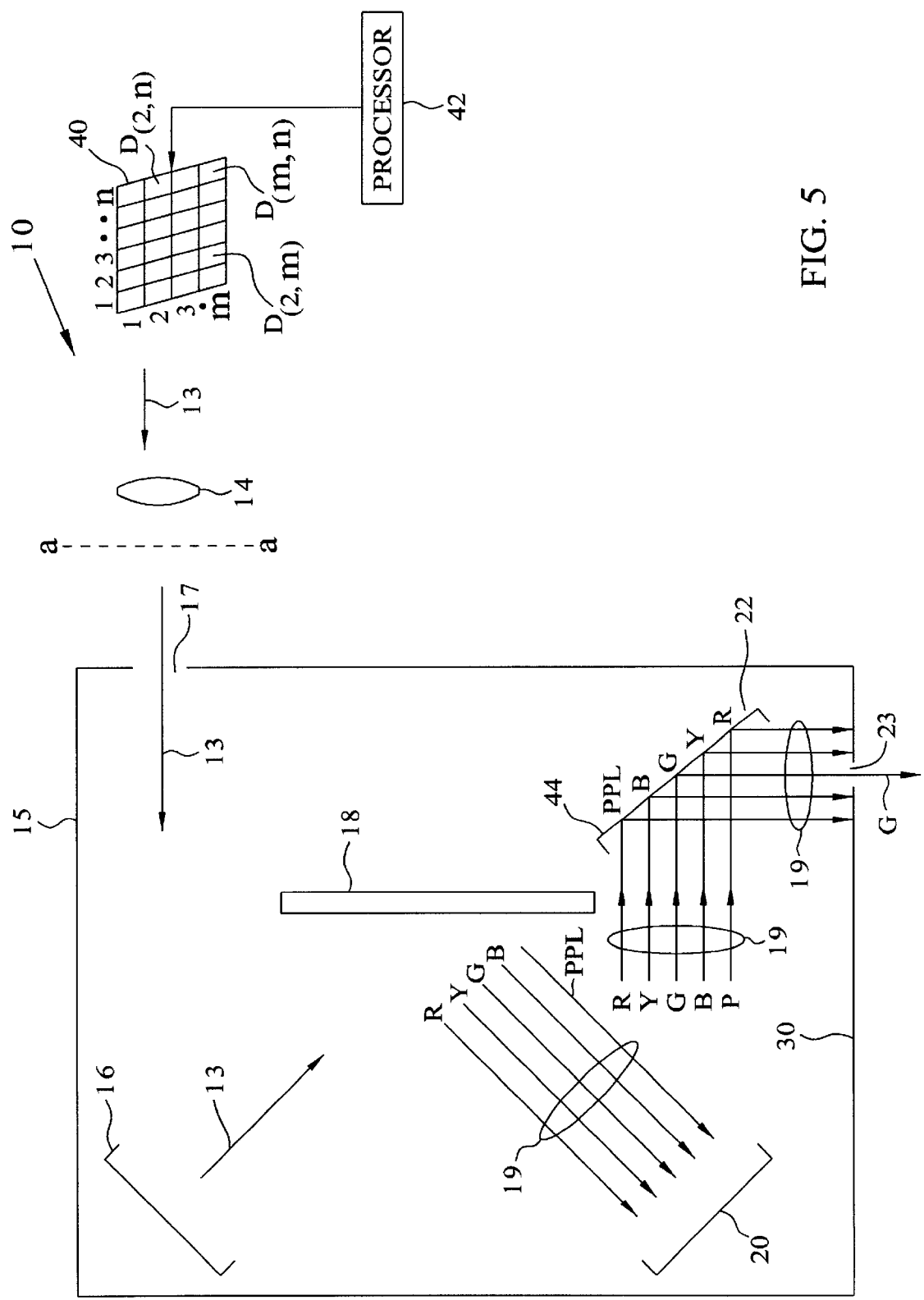
FIG. 5 shows yet another embodiment of a tunable spectral source that embodies various features of the present invention.

As shown in FIG. 5, broadband light source 11 may be implemented as an M X N array 40 of pixel source elements $PE_{(M,N)}$ that each cause one or more of broadband or white light signals $13_{(M,N)}$ to be directed onto optical refractive element 18B at a unique angle of incidence $\theta_{(M,N)}$, where M and N each represent positive integers. Selective control of the particular pixel source element $PE_{(M,N)}$ may be effectuated under the supervision of processor 42, such as a PC based computer, in order to select the particular portion of spectral component signals 19 that are emitted from enclosure 15 through aperture 23. FIG. 5 also shows that spectral component signals 19 may be reflected 90 degrees by mirror 44, whereupon a selected portion of spectral component signals 19 are directed out aperture 23 of enclosure 15.

Obviously, many modifications and variations of the present invention are possible in light of the above teachings. It is therefore to be understood that within the scope of the appended claims, the invention may be practiced otherwise than as specifically described.

We claim:

1. A tunable spectral source, comprising:
   multiple pixel source elements for emitting broadband light signals;
   an enclosure having a first aperture and a second aperture;
   a first mirror mounted in said enclosure for receiving and collimating said broadband light signals received through said first aperture:
   an optically diffractive element mounted in said enclosure for receiving said broadband light signals from said first mirror and diffracting said broadband light signals into spectral component signals: and
   a second mirror mounted in said enclosure for directing said spectral component signals received from said optically diffractive element so that selected ones of said spectral component signals are emitted from said second aperture based on which of said pixel source elements generate said broadband light signals.

2. The tunable spectral source of claim 1 further including a processor for directing one or more of said multiple pixel source elements to emit said broadband light signals.

3. The tunable spectral source of claim 1 wherein said optically diffractive element is a diffraction grating.

4. The tunable spectral source of claim 1 wherein said broadband light signals each are white light signals.

5. The tunable spectral source of claim 1 wherein said spectral component signals are in bands ranging from long infrared to ultraviolet light.

6. The tunable spectral source of claim 1 further including a first lens for focusing said broadband light signals on a focal plane.

7. The tunable spectral source of claim 1 wherein each of said broadband light signals irradiates said optically diffractive element at a unique angle of incidence that determines which of said spectral component signals are emitted through said second aperture.

* * * * *